(12) United States Patent
Deshpande et al.

(10) Patent No.: US 7,788,431 B2
(45) Date of Patent: Aug. 31, 2010

(54) DYNAMIC I2C SLAVE DEVICE ADDRESS DECODER

(75) Inventors: Amrita Deshpande, Chandler, AZ (US);
Alma Anderson, Chandler, AZ (US);
Jean-Marc Irazabal, Santa Clara, CA (US)

(73) Assignee: NXP B.V., Eindhoven (NL)

( * ) Notice: Subject to any disclaimer, the term of this patent is extended or adjusted under 35 U.S.C. 154(b) by 100 days.

(21) Appl. No.: 11/913,069

(22) PCT Filed: May 1, 2006

(86) PCT No.: PCT/IB2006/051366

§ 371 (c)(1),
(2), (4) Date: Oct. 29, 2007

(87) PCT Pub. No.: WO2006/117753

PCT Pub. Date: Nov. 9, 2006

(65) Prior Publication Data

US 2008/0147941 A1 Jun. 19, 2008

Related U.S. Application Data

(60) Provisional application No. 60/676,105, filed on Apr. 29, 2005.

(51) Int. Cl.
*G06F 13/00* (2006.01)
(52) U.S. Cl. .............................. 710/110; 710/4; 710/18
(58) Field of Classification Search ...................... 710/3, 710/4, 8–10, 15, 18, 104, 107, 110, 305
See application file for complete search history.

(56) References Cited

U.S. PATENT DOCUMENTS

| 5,860,028 | A | * | 1/1999 | Pecore ........................ 710/41 |
| 5,878,234 | A | * | 3/1999 | Dutkiewicz et al. .......... 710/110 |
| 6,122,690 | A | * | 9/2000 | Nannetti et al. ............. 710/311 |

(Continued)

OTHER PUBLICATIONS

I2C Bus Compatible Serial EEPROM, ROHM, undated.*
"AN469 I2C/SMBUS General Purpose I/O Expanders" Philips Application Note, Jan. 20, 2005.
Deshpande, Amrita "Design of a Behavioral (Register Transfer Level, RTL) Model of the Inter-Integrated Circuit or I2C-Bus Master-Slave Interface" Master's Thesis of Amrita Deshpande, University of New Mexico, 1999.

*Primary Examiner*—Khanh Dang

(57) ABSTRACT

Consistent with one example embodiment, a communications system uses an I2C serial data transfer bus that has a serial data line (110) and a clock line (120) used to implement a communications protocol. The communications system includes a slave device having address pins (400), each coupled to the serial data line, clock line, power line, or ground. Communications circuitry communicates with a master device in accordance with the communications protocol over the data transfer bus. Decoding circuitry detects a first state of the address pins (410), detects a second state of the address pins (420) subsequent to the detection of the first state, wherein one or more logic values of the address pins differ between the first state and the second state, and decodes a slave device address (430) as a functional relationship between the first state and the second state of the address pins.

20 Claims, 4 Drawing Sheets

U.S. PATENT DOCUMENTS

| | | | |
|---|---|---|---|
| 6,255,973 B1 * | 7/2001 | Smith et al. | 341/141 |
| 6,510,522 B1 * | 1/2003 | Heinrich et al. | 726/34 |
| 6,530,029 B1 * | 3/2003 | Metchev | 713/500 |
| 6,622,188 B1 * | 9/2003 | Goodwin et al. | 710/105 |
| 6,745,270 B1 * | 6/2004 | Barenys et al. | 710/104 |
| 6,799,233 B1 | 9/2004 | Deshpande et al. | |
| 7,484,027 B1 * | 1/2009 | Dahlin | 710/305 |
| 2005/0097255 A1 * | 5/2005 | Barenys et al. | 710/316 |
| 2005/0120155 A1 * | 6/2005 | Chao | 710/305 |
| 2007/0250648 A1 * | 10/2007 | Picard et al. | 710/9 |
| 2008/0162758 A1 * | 7/2008 | Gideons | 710/110 |
| 2008/0215779 A1 * | 9/2008 | Deshpande et al. | 710/110 |
| 2008/0270654 A1 * | 10/2008 | Reberga | 710/110 |

* cited by examiner

DYNAMIC I2C SLAVE DEVICE ADDRESS DECODER

The present invention is directed generally to communication devices and methodologies, and more particularly, to methods and arrangements for dynamically changing and decoding slave device addresses.

The Inter-Integrated Circuit (I2C) bus developed by Philips Corporation allows integrated circuits to communicate directly with each other via a simple bi-directional 2-wire bus (plus power and ground). A device connects to each of the two wires on the bus, one serial data line (SDA) for the communication of data, and the other serial clock line (SCL) for the control and synchronization of the communication of data between the devices. Each device is connected in parallel to each of the other devices, and each of the bus lines, SDA and SCL, function as a wired-AND of all the lines on the bus. The output of each device is configured as an open-collector/open-drain device, and one or more pull-up resistors maintain a 'soft' logic high value on the bus while the bus is in the quiescent state. When a device desires access to the bus, the device pulls the bus to a logic low value, via the open-collector/open-drain device that is placed in a conductive state to ground potential.

Each device that is connected to an I2C bus is identifiable by an address, and can operate as either a transmitter or a receiver, or both. Data transfers are effected using a master-slave communications protocol. A master is a device that initiates a data transfer and generates the clock signals to permit the transfer; any device that is addressed is considered a slave for this transfer. The data transfer can be initiated by a master to either transmit data to the slave (herein designated as write), or to request data from the slave (herein designated as read). For example, an output device, such as a display screen, is typically not able to initiate a data transfer, and therefore would be configured to only operate as a slave device. A microprocessor, on the other hand, will typically be configured to operate as either a master or a slave, as the situation demands.

In a quiescent state, both the SDA and SCL bus lines are in the logic-high state (herein designated as high, or logic state of 1). A master initiates a data transfer by asserting a transition to a logic-low state (herein designated as low, or logic state of 0) on the SDA line while the SCL line is high; this is termed a START condition. Thereafter, the master toggles the SCL line to control the synchronization of the data transfer; data value changes occur on the SDA line when the SCL clock is low, and the state of the SDA line is considered valid only when the SCL clock is high.

Multiple STARTs can be asserted to effect a series of data transfers within the same transfer session. Generally, each data transfer requires an acknowledgement from the addressed recipient of the data transfer. To terminate the data transfer, the host asserts a low-to-high transition on the SDA line while the SCL clock is high; this is termed a STOP condition. Thereafter, any device may assume control of the bus as a master by asserting a high-to-low transition on the SDA line, as above. Note that, for ease of reference, the term assert is used herein for effecting, or attempting to effect, the specified logic state. In the example of a transition to a logic-high state, this is typically provided by a release of the bus from a forced pull-down state by the asserting device. This assertion of a logic-high state allows the aforementioned pull-up devices on the bus to bring the bus to a logic-high state, unless another device is also forcing the pull-down state.

The general format of an I2C data transfer involves signals on an SDA line and an SCL line forming the I2C bus. A START condition (S) corresponds to high-to-low transition of the signal on the SDA line while the SCL line is high. After the START, the host transmits an address, nominally seven bits, followed by a read/write-not indicator. After transmitting the address and the direction of data transfer (R/W-), the host releases the SDA line, allowing it to rise to a logic-high level. If a slave device recognizes its address, the slave device transmits an acknowledge signal (ACK) by pulling the bus low. The absence of a low signal when the host releases the SDA line, therefore, indicates a non-acknowledgement (NAK). If the address is acknowledged, via a low at SDA, the transmitting device transmits the data. If the direction of data transfer is a "read" relative to the host, then the slave device is the transmitting device; if the direction is a "write" relative to the host, then the master device is the transmitting device. The transmitting device releases control of the SDA line, and the receiving device acknowledges the receipt of the data by asserting a logic-low value on the SDA line. If the data is acknowledged, the transmitter sends additional data. This process continues until the entirety of the data is communicated, or until a transmitted data item is not-acknowledged. The master can subsequently reassert a START signal, and repeat the process above, or, can assert a STOP signal (P) to terminate this data-transfer session.

The above interface protocol can be implemented in a variety of ways. To minimize the development time for programming or designing an I2C interface, a variety of general-purpose interface schemes have been published. "Design Of A Behavioral (Register Transfer Level, RTL) Model Of The Inter-Integrated Circuit Or I2C-Bus Master-Slave Interface", Master's Thesis of Amrita Deshpande, University of New Mexico, 1999, discloses an I2C master interface and slave interface that is intended to be embodied in an I2C device, and is incorporated by reference herein. By providing a verified I2C interface, system designers need not address the details of the I2C specification and protocol. Both the master and the slave interfaces of this thesis are state-machine based. State-machine based systems and methods are further described in U.S. Pat. No. 6,799,233, which is hereby incorporated herein by reference.

Various aspects of the present invention are directed to methods and arrangements for dynamically changing and decoding slave device addresses in a manner that addresses and overcomes the above-mentioned issues.

Consistent with one example embodiment, the present invention is directed to a communications system that uses an I2C serial data transfer bus that has a serial data line and a clock line used to implement a communications protocol. The communications system includes a slave device having address pins, each address pin coupled to the serial data line or the clock line or a power line or a ground. Communications circuitry in the slave device is configured to communicate with a master device in accordance with the communications protocol over the data transfer bus. Decoding circuitry in the slave device is configured to detect a first state of the address pins of the slave device in response to a transition from a logic high to a logic low on the serial data line when the clock line is logic high, detect a second state of the address pins of the slave device when the clock line transitions from logic high to logic low, wherein one or more logic values of the address pins differ between the first state and the second state, and decode a slave device address as a functional relationship between the first state and the second state of the address pins.

Consistent with another example embodiment, the present invention is directed to a method involving detecting a first state of address pins of the slave device in response to a start condition on the serial data transfer bus, detecting a second state of the address pins of the slave device subsequent to the detection of the first state, wherein one or more logic values of the address pins differ between the first state and the second state, and decoding a slave device address as a functional relationship between the first state and the second state of the address pins.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

The invention may be more completely understood in consideration of the following detailed description of various embodiments of the invention in connection with the accompanying drawings, in which.

Figure 1:
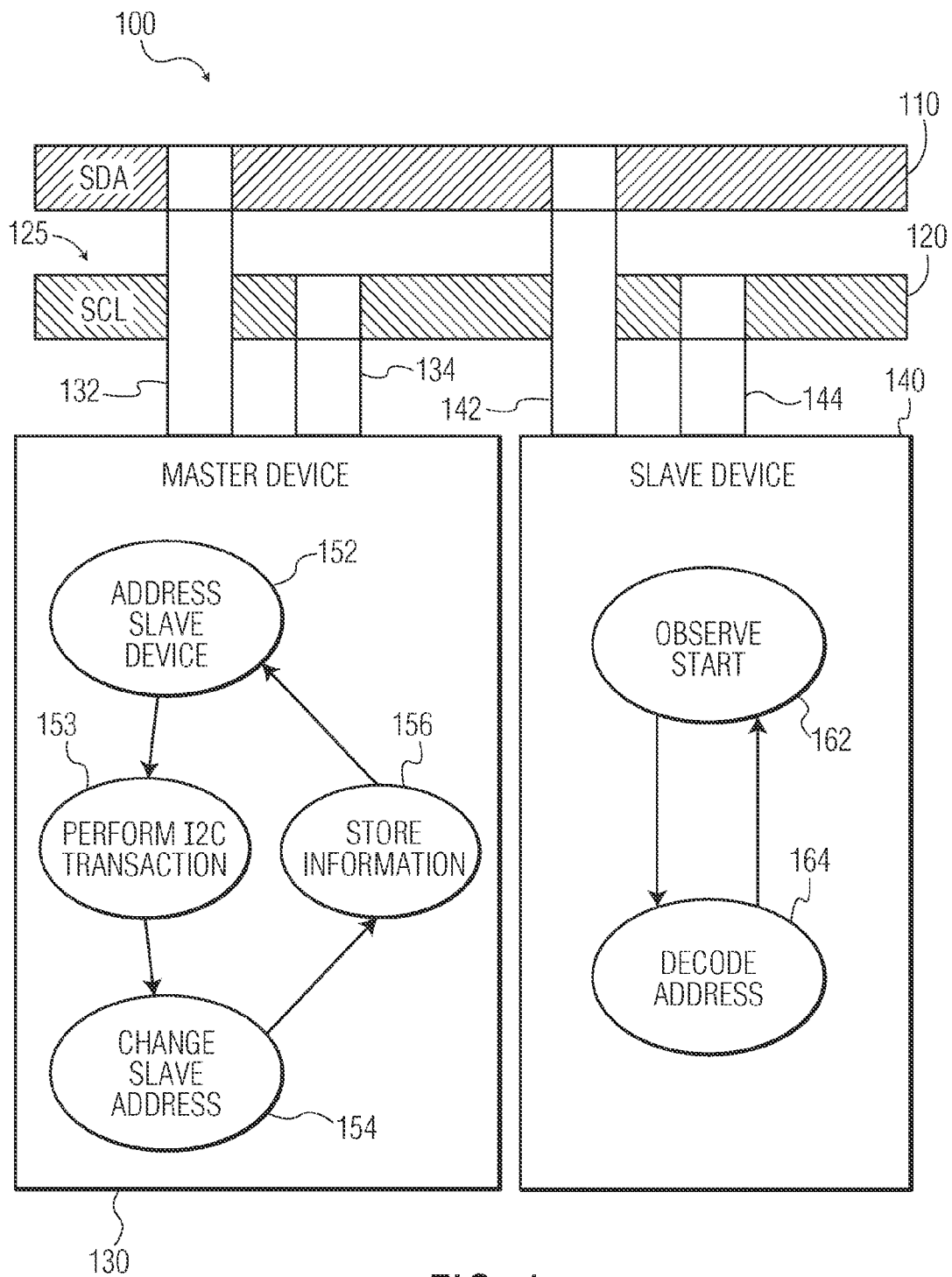
FIG. 1 is a block diagram of a data communications system implementing changing and decoding of slave device addresses in accordance with embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is generally applicable to methods and arrangements for dynamically changing and decoding slave device addresses. The invention has been found to be particularly advantageous for Inter Integrated Circuit (I2C) serial data communications busses, but is also advantageous for other busses and communications protocols, such as system management bus (SMBus) architectures and/or protocols. For purposes of illustration, and not of limitation, the invention will be described in the context of an I2C bus having a master device controlling communication to a slave device.

Masters control the communication with I2C slaves on the I2C bus architecture. I2C slaves find numerous applications in fields ranging from cell phones, PDAs and SmartPhones to LCD TVs, Medical Equipment, Gaming, and other applications. Consistent with one example embodiment, communications systems, using a serial data transfer bus having a serial data line and a clock line used to implement a communications protocol, incorporate slave devices with dynamic slave address decoders. For example, devices in accordance with the present invention may be implemented in an I2C slave device with external, programmable address pins. Implementation of the slave address decoder in accordance with the present invention provides for the slave address to be changed, dynamically, in-between I2C transactions, and the slave address will be decoded correctly without having to reset or power down the part.

Implementation of dynamic slave device address decoding in accordance with the present invention does not require an external clock because of the use of internal delay cells. The delay cells provide the timing for the address decoding without the use of a separate clock. The slave address is detected at the end of every START condition of the I2C communication sequence. Because of this feature, the slave address can change any time before the START condition and the decoder will decode the correct address.

In one embodiment of the present invention, slaves have external, programmable address pins that can be connected to one of, VDD (Power), GND (Ground), SCL and SDA. Because of four possible connections to the address pin, there are four possible values that the address pin can have. The present invention provides for detection of the connection to the address pin during a START condition on the I2C bus.

Inter-integrated circuit slave devices using dynamic changing and decoding of slave devices on a serial bus may be configured as general purpose Input/Output (GPIO) devices, or other slave devices. The communication system may conform to I2C, SMBus, and/or other serial communication specifications.

FIG. 1 is a block diagram of a data communications system 100 implementing dynamic changing and decoding of slave device addresses in accordance with embodiments of the present invention. An SDA line 110 and an SCL line 120 are arranged as an I2C data bus 125. A master device 130 and a slave device 140 are attached to the I2C data bus 125. The master device 130 is electrically connected to the I2C data bus 125 using a clock connection 134 and a data connection 132 electrically connected to the SCL line 120 and the SDA line 110 respectively.

The slave device 140 is electrically connected to the I2C data bus 125 using a clock connection 144 and a data connection 142 electrically connected to the SCL line 120 and the SDA line 110 respectively. In one embodiment of dynamically changing slave device addresses, the master device 130 addresses 152 the slave device 140 using a current device address, performs 153 an I2C transaction with the slave device 140, and then changes 154 the slave's address. The master 130 then stores 156 the slave's new address information in memory for future use. The slave device 140 detects 162 a START condition, and subsequently decodes 164 its address.

Figure 2:
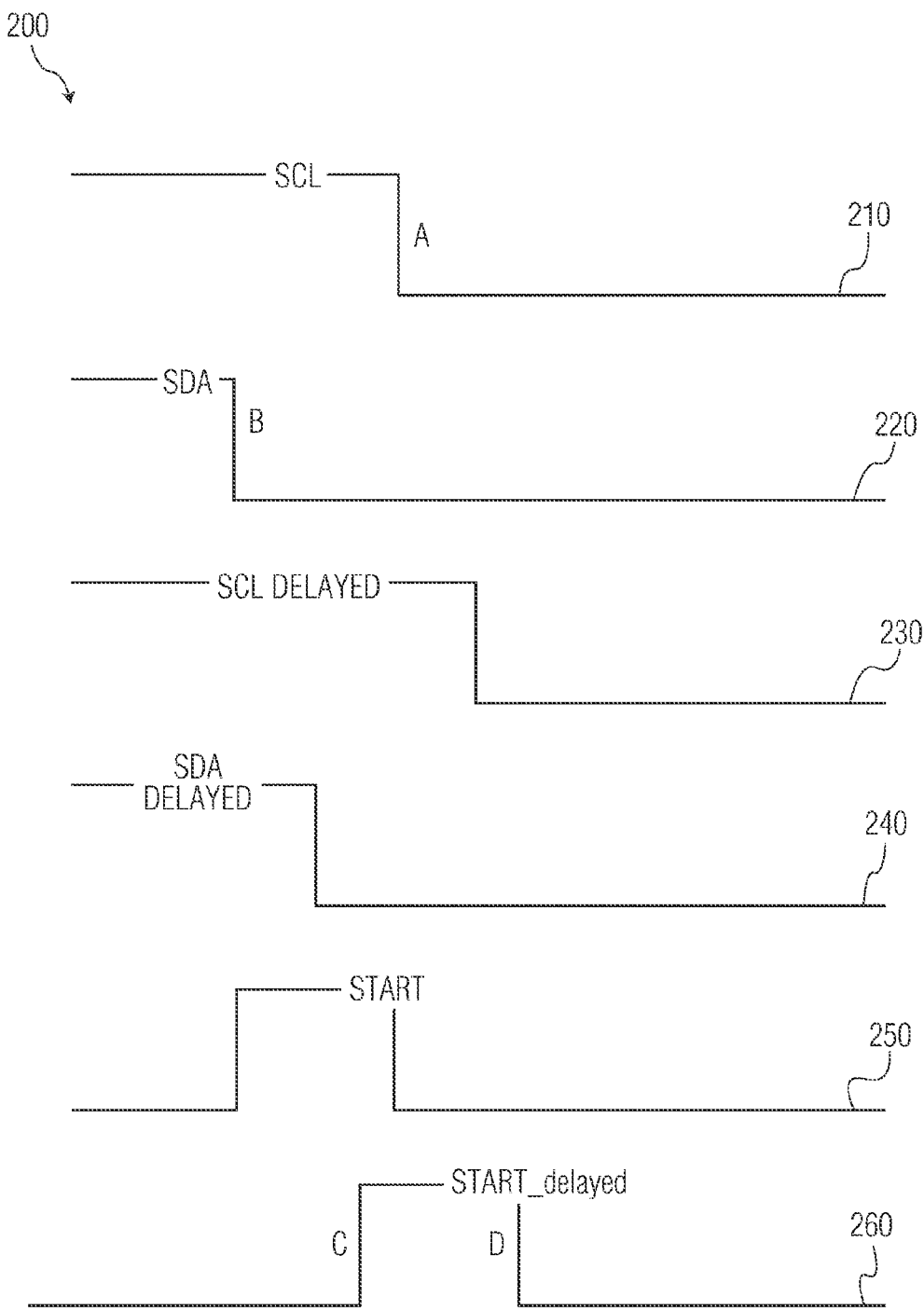
FIG. 2 is an illustration of a data stream for a data communications system implementing changing and decoding of slave device addresses in accordance with embodiments of the present invention.

FIG. 2 is an illustration of a timing diagram 200 for a data communications system implementing dynamic changing and decoding of slave device addresses in accordance with embodiments of the present invention. The timing diagram 200 is illustrated in FIG. 2 consistent with an I2C communications protocol. A dynamic slave address decoder in accordance with the present invention uses an I2C clock line 210 (SCL) and an I2C data line 220 (SDA) inputs. A START condition (as defined in the I2C protocol) is generated on the I2C bus (which consists of the SCL and the SDA signals) and illustrated in a START line 250. During the START condition, the SCL line 210 is HIGH while the SDA line 220 makes a transition from HIGH to LOW. If the address pin of a slave device is connected to either of these two lines, it will follow them respectively. For example, if the address pin is connected to SCL line 210, the address pin will transition from a HIGH to a LOW when the SCL line 210 does. Similarly, if the address pin is connected to the SDA line 220, it will transition from a HIGH to a LOW when the SDA line 220 does.

The slave address decoder circuit detects this transition on the address pin, if it happens, and stores that information in a register for future reference. There is no higher frequency external clock that is used to synchronize the SCL and SDA signals to, in order to store their values before and after the transition on those lines. In order to detect these transitions, without any external clock, delay cells are used to generate delayed versions of the address pin. For example three delay cells may be used to provide a delayed SCL 230, a delayed SDA 240, and a delayed START 260.

The first HIGH to LOW transition on the SDA line 220 (denoted by "B" in the timing diagram) is used to latch the value of the delayed version of the address pin. This sets the value of the address pin before the SDA transitioned. If this value is a LOW, we conclude that the address pin is connected to GND.

The first HIGH to LOW transition on the SCL line 210 (denoted by "A" in the timing diagram) is also used to latch the value of the delayed version of the address pin. This sets the value of the address pin before the SCL transitioned. If the value is LOW, then we conclude that the address pin is connected to either GND or SDA.

The rising edge on the delayed START line 250, (denoted by "C" in the timing diagram) is used to latch the value of the address pin after the falling edge transition on the SDA line to detect if the address pin changes with the SDA line. This is done by XOR-ing the address pin and the SDA line, as will be seen with reference below to FIG. 3. The falling edge of the delayed START line 250 (denoted by "D" in the timing diagram) is used to latch the detection of the address pin's connection to SCL and SDA as follows:

The address pin is connected to GND when the address pin value is LOW at B.

The address pin is connected to SDA if we know that the address pin maintained a HIGH at B and a LOW at C.

The address pin is connected to SCL if it maintained a HIGH at C and a LOW at D.

The address pin is connected to VDD if it maintained a HIGH at A, as well as at D.

Depending on the combination of the four signals, SCL, SDA, VDD, GND, and the number of address pins used (x), up to 4x addresses may be detected. In this way, using delay cells, without the use of an external oscillator, the slave address is decoded during every START condition and stored for reference.

Figure 3:
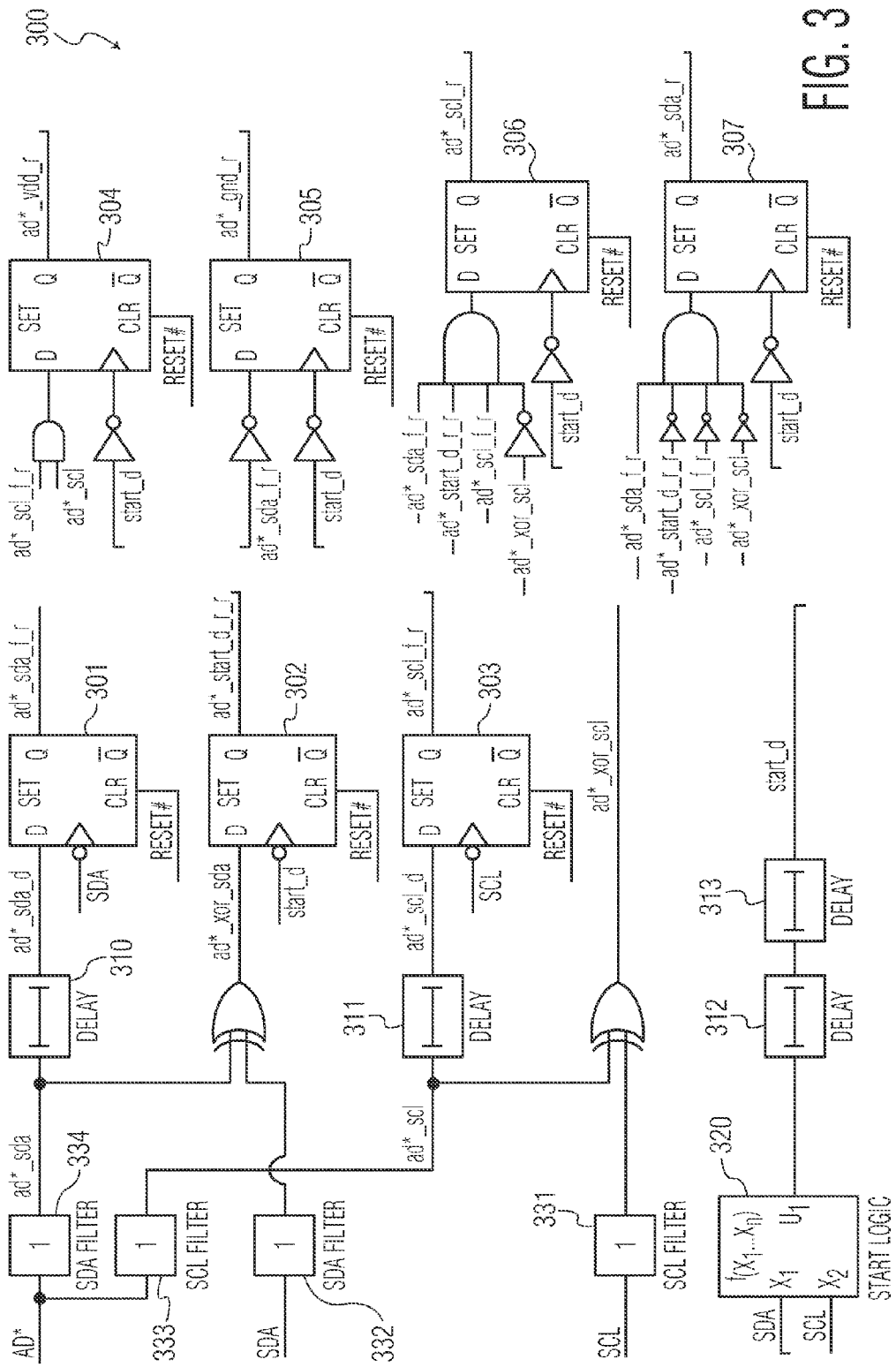
FIG. 3 is a block diagram of a system implementing changing and decoding of slave devices in accordance with embodiments of the present invention.

FIG. 3 is a block diagram of a system 300 implementing dynamic changing and decoding of slave device addresses in accordance with embodiments of the present invention. The system 300 is illustrated as implemented using D-flip-flops 301-307 and common logic gates. Delay cells 310-313 may be implemented, for example, using RC delay circuitry. Start logic 320 is used to dynamically decode the device's address, as described above. Filters 331, 332, 333, and 334 may be implemented as transistor level glitch filters, such as are known in the art. All relevant inputs and outputs to the logic blocks are identified by unique names. For example, the SCL line is illustrated as an input to start logic 320, SCL filter 331, and the clock input to D-flip-flop 303.

Figure 4:
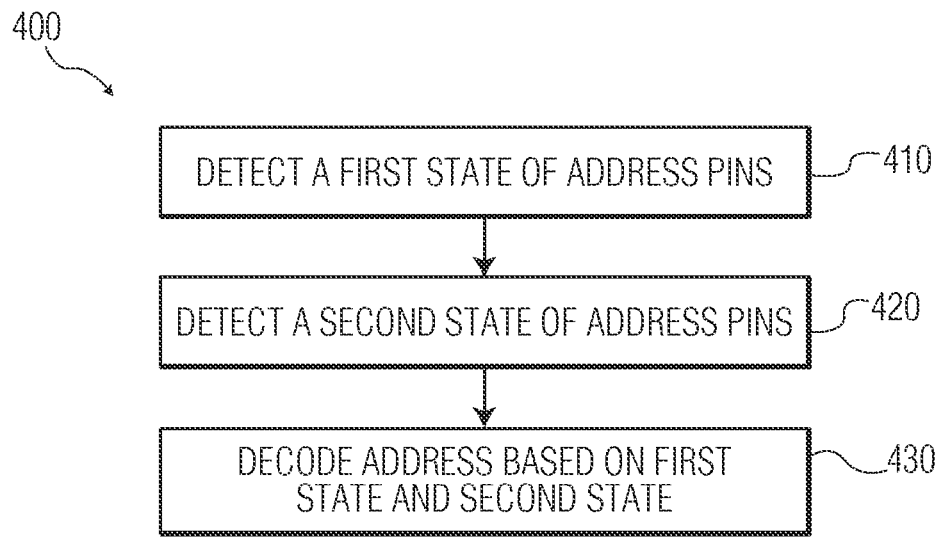
FIG. 4 is a flow chart of a method for dynamically changing and decoding slave device addresses in accordance with embodiments of the present invention.

FIG. 4 is a flow chart of a method 400 for dynamically changing and decoding slave device addresses in accordance with embodiments of the present invention. The method 400 involves detecting 410 a first state of the address pins, detecting 420 a second state of the address pins, and decoding 430 an address based on the first and second state of the address pins.

Figure 5:
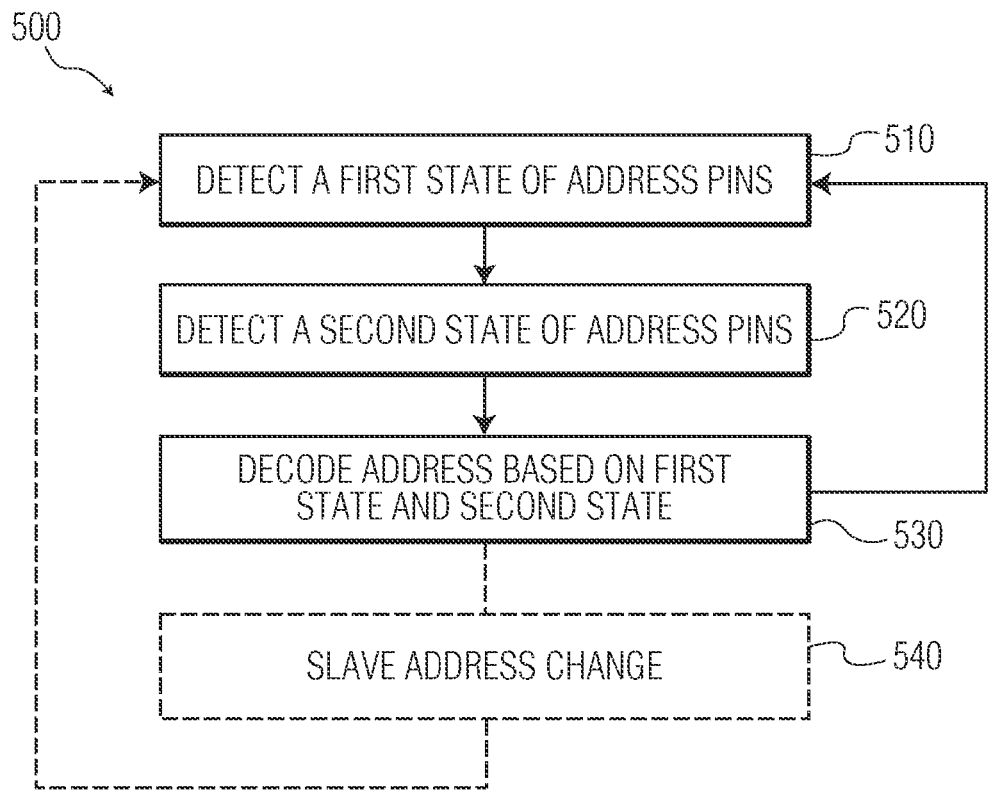
FIG. 5 is a flow chart of another method for dynamically changing and decoding slave device addresses in accordance with other embodiments of the present invention.

FIG. 5 is a flow chart of a method 500 for dynamically changing and decoding slave device addresses in accordance with other embodiments of the present invention. In one illustrative example, a slave device may be connected to an I2C bus. The slave device may include circuitry configured to couple each of the slave's address pins to one of power, ground, SDA, or SCL. The circuitry may be alterable or programmable, such that a master device may change the slave device's address.

The method 500 involves detecting 510 a first state of the address pins, detecting 520 a second state of the address pins, and decoding 530 an address based on the first and second state of the address pins. The slave device's address may be changed 540, such that the slave recognizes a different address at the next START command. This may be useful, for example, for supporting more physical devices on an I2C bus than the logical addresses are capable of supporting.

Hardware, firmware, software or a combination thereof may be used to perform the various embodiments for dynamically changing and decoding slave device addresses as described herein. The master device functionality used in connection with the invention may reside in an I2C master device as described, or may alternatively reside on a stand-alone or networked computer attached to the serial data communications system 100. The serial data communications system 100 illustrated in FIG. 1 is an example structure that can be used in connection with such communications systems, computers, or other computer-implemented devices to carry out operations of the present invention.

The example master device 130 illustrated in FIG. 1, suitable for controlling the I2C communications on the I2C bus in accordance with the present invention, typically includes a central processor (CPU) coupled to random access memory (RAM) and/or some variation of read-only memory (ROM). The ROM may also be other types of storage media to store programs, such as programmable ROM (PROM), erasable PROM (EPROM), etc. The processor may communicate with other internal and external components through input/output (I/O) circuitry and/or other bussing, to provide control signals, communication signals, and the like.

The master device 130 may also include one or more data storage devices, including hard and floppy disk drives, CD-ROM drives, and other hardware capable of reading and/or storing information, such as DVD, etc. In one embodiment, software for dynamically changing and decoding slave device addresses may be stored and distributed on a CD-ROM, diskette, or other form of media capable of portably storing information. These storage media may be inserted into, and read by, devices such as a CD-ROM drive, the disk drive, etc. The software may also be transmitted to the computing arrangement via data signals, such as being downloaded electronically via a network, such as the Internet. Further, as previously described, the software for carrying out the functions associated with the present invention may alternatively be stored in internal memory/storage of the computing device, such as in the ROM.

Any resulting program(s), having computer-readable program code, may be embodied within one or more computer-usable media such as memory devices or transmitting devices, thereby making a computer program product or article of manufacture according to the invention. As such, the terms "computer readable medium," "article of manufacture," "computer program product" or other similar language as used herein are intended to encompass a computer program which exists permanently, temporarily, or transitorily on any computer-usable medium such as on any memory device or in any transmitting device.

Each feature disclosed in this specification (including any accompanying claims, abstract, and drawings), is replacable by alternative features having the same, equivalent or similar purpose, unless expressly stated otherwise. Thus, unless expressly stated otherwise, each feature disclosed is one example only of a generic series of equivalent or similar features.

The present invention should not be considered limited to the particular examples described above. Various modifications, equivalent processes, as well as numerous structures to which the present invention may be applicable fall within the scope of the present invention. For example, embodiments for dynamically changing and decoding slave device addresses in accordance with the present invention can be implemented using a similarly constructed one-way or two-way interface for communication between devices on a common bus, such as an SMBus or other bus arrangement. Such variations may be considered as part of the claimed invention, as fairly set forth in the appended claims.

What is claimed is:

1. In a data communications system using a serial data transfer bus that has a serial data line and a clock line used to implement a communications protocol, a method for a slave device to decode its device address, the method comprising:
    detecting a first state of address pins of the slave device in response to a start condition on the serial data transfer bus, the address pins being used for communication via the communication protocol, a first one of the address pins coupled to the serial data line and a second one of the address pins coupled to the clock line;
    detecting a second state of the address pins of the slave device subsequent to the detection of the first state, wherein one or more logic values of the address pins differ between the first state and the second state; and
    decoding a slave device address as a functional relationship between the logic values of the address pins in the first state and the logic values of the address pins in the second state.

2. The method of claim 1, comprising generating a START signal using the functional relationship.

3. The method of claim 1, comprising altering the slave device address in response to a request by a master device on the serial data transfer bus.

4. The method of claim 3, comprising reinstating the slave device address in response to a subsequent request by the master device on the serial data transfer bus.

5. The method of claim 1, comprising detecting the state of an address pin as associated with the serial data line or the clock line or a power line or a ground.

6. In a communications system using an I2C serial data transfer bus that has a serial data line and a clock line used to implement a communications protocol, a slave device, comprising:
    a plurality of address pins used for communication via the communication protocol, a first one of the address pins coupled to the serial data line and a second one of the address pins coupled to the clock line;
    communications circuitry coupled to the data transfer bus and configured to communicate with a master device in accordance with the communications protocol over the data transfer bus; and
    decoding circuitry coupled to the plurality of address pins and configured to detect a first state of the plurality of address pins of the slave device in response to a start condition on the serial data transfer bus, detect a second state of the address pins of the slave device subsequent to the detection of the first state, wherein one or more logic values of the address pins differ between the first state and the second state, and decode a slave device address as a functional relationship between the logic values of the address pins in the first state and the logic values of the address pins in the second state.

7. The device of claim 6, the decoding circuitry comprising delay circuitry configured to delay a transition of the clock line.

8. The device of claim 6, the decoding circuitry comprising delay circuitry configured to delay a transition of the serial data line.

9. The device of claim 6, the decoding circuitry comprising delay circuitry configured to delay a transition of the clock line and the serial data line.

10. The device of claim 6, comprising address circuitry configured to alter the slave device address, the address circuitry coupling the address pins to the serial data line or the clock line or the power line or the ground.

11. The device of claim 10, the address circuitry further configured to reinstate the slave device address in response to a subsequent request by a master device on the serial data transfer bus.

12. A computer-readable medium storing computer-executable instructions for a slave device to decode its device address, the slave device configured to communicate over a serial data transfer bus that has a serial data line and a clock line used to implement a communications protocol, the computer-executable instructions executable by a computer for performing steps comprising:
    detecting a first state of address pins of the slave device in response to a start condition on the serial data transfer bus, the address pins being used for communication via the communication protocol, a first one of the address pins coupled to the serial data line and a second one of the address pins coupled to the clock line;
    detecting a second state of the address pins of the slave device subsequent to the detection of the first state, wherein one or more logic values of the address pins differ between the first state and the second state; and
    decoding a slave device address as a functional relationship between the logic values of the address pins in the first state and the logic values of the address pins in the second state.

13. The computer-readable medium of claim 12, the computer-executable instructions further including an instruction for performing the step comprising:
    altering the slave device address in response to a request by a master device on the serial data transfer bus.

14. The computer-readable medium of claim 13, the computer-executable instructions further including an instruction for performing the step comprising:
    reinstating the slave device address in response to a subsequent request by a master device.

15. The computer-readable medium of claim 12, the computer-executable instructions further including an instruction for performing the step comprising:
    generating a delayed start signal using the functional relationship.

16. An I2C slave device having a dynamically programmable address and configured to communicate with an I2C master device over an I2C serial data transfer bus that includes a serial data line and a clock line, the I2C slave device comprising:
    a plurality of address pins, a first one of the address pins coupled to the serial data line of the I2C serial data transfer bus and a second one of the address pins coupled to the clock line of the I2C serial data transfer bus;

a plurality of delay cells coupled to ones of the address pins and configured to generate delayed versions of states of the ones of the address pins;

communications circuitry coupled to the I2C serial data transfer bus and configured to communicate with the master device in accordance with an I2C communications protocol over the I2C serial data transfer bus; and decoding circuitry coupled to the plurality of address pins and configured to decode the dynamically programmable address of the I2C slave device in response to a start condition on the I2C serial data transfer bus by detecting a first state of the address pins in response to the start condition, detecting a second state of the address pins subsequent to the detection of the first state, one or more logic values of the address pins differing between the first state and the second state, and decoding the address of the I2C slave device based on the logic values of the address pins in the first state and based on the logic values of the address pins in the second state.

17. The I2C slave device of claim 16, wherein a first one of the delay cells is coupled to the first address pin, the first delay cell configured to generate a delayed version of the state of the serial data line, and a second one of the delay cells is coupled to the second address pin, the second delay cell configured to generate a delayed version of the state of the clock line.

18. The I2C slave device of claim 17, further comprising start logic coupled to the I2C serial data transfer bus and configured to detect a start condition on the I2C serial data transfer bus and to generate a start signal responsive thereto, wherein a third one of the delay cells is coupled to the start logic, the third delay cell configured to generate a delayed version of the start signal.

19. The I2C slave device of claim 16, wherein additional ones of the plurality of address pins are coupled to one of a power line and a ground.

20. The I2C slave device of claim 16, wherein the I2C slave device is configured to decode the dynamically programmable address in response to each start condition on the I2C serial data transfer bus and to store the decoded address in the I2C slave device for use in subsequent communication with the master device over the I2C serial data transfer bus.

* * * * *